Aug. 27, 1957  W. V. KENNEDY  2,804,211
LIQUID FILTER
Filed April 22, 1955

*INVENTOR.*
WALTER V. KENNEDY
BY
*Charles C. Willson*
ATTORNEY

United States Patent Office 2,804,211
Patented Aug. 27, 1957

2,804,211

LIQUID FILTER

Walter V. Kennedy, Central Falls, R. I., assignor to Fram Corporation, Providence, R. I., a corporation of Rhode Island Application April 22, 1955, Serial No. 503,267

1 Claim. (Cl. 210—434)

This invention relates to filters for volatile liquids, and more particularly to a filter for use with an internal combustion engine for filtering the gasoline supplied to the engine.

Filters for filtering the gasoline supply to internal combustion engines such as employed in motor vehicles have been used heretofore, but trouble has been experienced with such filters due to the vapor that arises from the gasoline and causes a vapor lock around the filter member. This may depress the level of the gasoline below the filter member and prevent the gasoline from reaching the engine, thus causing the engine to stall.

A primary object of the present invention is to provide a simple and inexpensive gasoline filter which will effectively remove water and dirt from the gasoline supplied thereto, and which will not vapor lock.

A more specific object of the invention is to provide a filter for volatile liquids such as gasoline, and which comprises a head and removable bowl secured thereto, and having mounted in the bowl a replaceable filter unit including a porous filter cup and a supporting plate for holding the filter cup in operating position in the bowl. Such supporting plate is provided with one or more channels extending across the upper edge of the filter cup to provide a gas vent around the edge of the cup.

Figure 1:
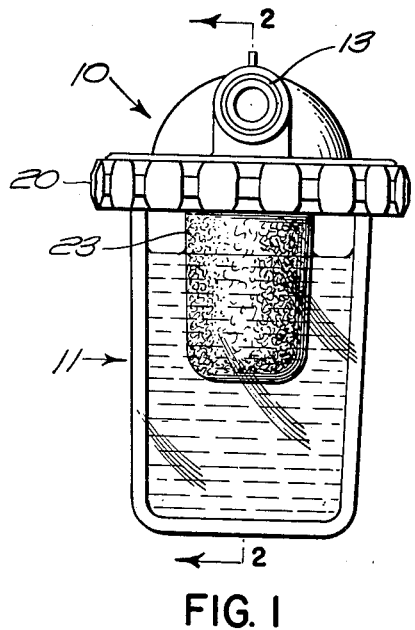

The above and other features of the invention will be further understood from the following description when read in connection with the accompanying drawing; wherein, Fig. 1 is a side view of the liquid filter of the present invention.

Figure 2:
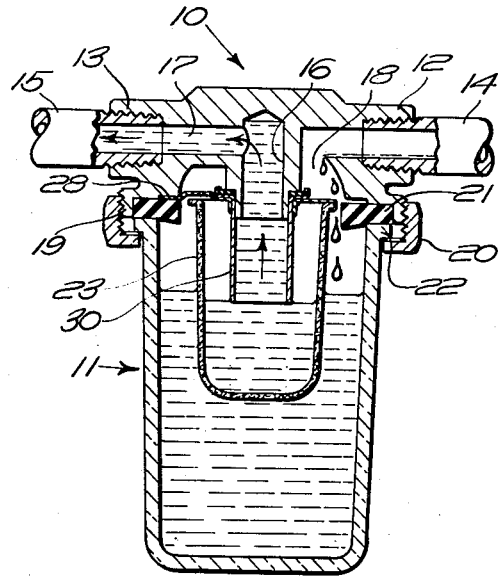

Fig. 2 is a sectional view taken on the line 2—2 of Fig. 1.

Figure 3:
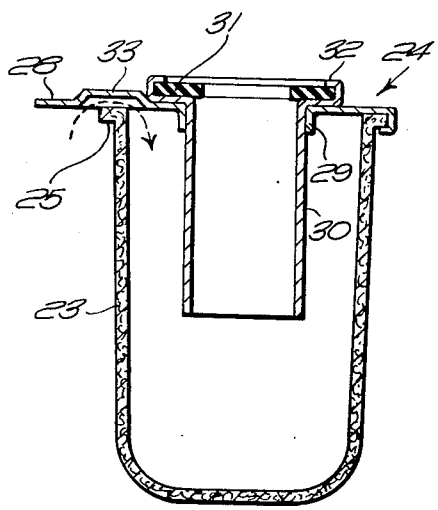
Figure 4:
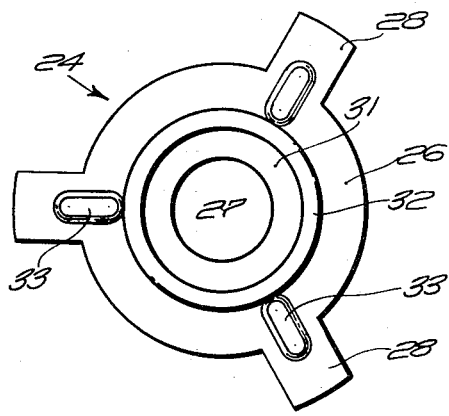

Fig. 3, on a larger scale, is a vertical sectional view through the porous filter cup and its supporting plate; and Fig. 4 is a top plan view of the supporting plate for the filter cup.

Now referring to the drawing, the embodiment of the invention shown therein has a head 10 which may be formed of metal, and a bowl 11 which preferably is formed of glass so that the fuel therein and dirt and water removed from the fuel can be observed through this glass. The head 10 has an internally threaded inlet 12 and an internally threaded outlet 13 whereby the filter is connected by the pipes 14 and 15 in the fuel line leading from the fuel pump to the carburetor. The head 10 which may be cast or molded has a central sleeve 16 and a passage 17 leading from the sleeve to the outlet 13. The gasoline which passes inwardly through the inlet 12 enters the annular space 18 about the sleeve 16.

The head 10 has extending downwardly therefrom an externally threaded outer flange 19 adapted to receive the internally threaded ring 20 which has the rough outer surface shown that can be firmly gripped in the hand to turn the ring. Within the annular flange 19 is retained a rubber ring or gasket 21 that seats against the lower face of the head 10. The glass bowl 11 is provided at its upper end with the outwardly extending flange 22 adapted to be engaged by a portion of the ring 20 as shown. The arrangement is such that the bowl 11 is secured to the head 10 with a sealed connection by screwing the ring 20 tightly upon the threaded flange 19.

The head 10 and bowl 11 together form a receptacle in which the novel filter unit which will now be described is secured. This filter unit, as best shown in Fig. 3, comprises a porous filter cup 23 which may be formed of molded pulp paper, and a relatively flat plate 24 that is secured to and supports the cup. The paper forming the cup 23 is preferably impregnated with a resin such as phenol formaldehyde to impart to the paper added stiffness and water resistance, or it may be treated to render it water repellent. This cup has an annular flange 25 at its upper end.

The plate 24 is preferably stamped from thin metal to the form shown in Fig. 4 and comprises the circular portion 26 having the central opening 27 and outwardly extending radial projections 28. The outer periphery of the portion 26, between the projections 28, is bent downwardly and around the flange 25 of the cup into gripping engagement therewith to secure the plate and cup firmly together. The cup 23 is secured in place in the bowl 11 by the projections 28 which are gripped between the lower face of the head 10 and upper face of the gasket 21, as shown in Fig. 2. This leaves a small space between the cup and surrounding gasket 21 through which gasoline can pass downwardly from the passage 18 into the bowl 11 as indicated by the drops shown in Fig. 2. The central opening 27 of the plate 24 has a downwardly extending flange 29, which snugly embraces a central tube 30 that extends downwardly a substantial distance into the cup 23, and the upper portion of this tube is bent outwardly and around a gasket 31, and embraces the upper marginal edge portion of such gasket, as at 32 to secure the gasket to the tube.

When the filter unit of Fig. 3 is in its operating position shown in Fig. 2 the gasket 31 sealingly embraces a reduced outer portion of the central sleeve 16 of the head 10, and this gasket and the tube 30 are held in sealing engagement with the sleeve 16 by the plate 24. The downwardly extending tube 30 helps to form an air pocket or vapor pocket in the upper portion of the bowl 11 and which pocket normally prevents the gasoline delivered into the bowl 11 from completely filling the bowl.

If a large amount of gasoline vapor should collect in the upper portion of the bowl 11 above the liquid level shown in Fig. 2, it might depress the level of the liquid in the bowl below the lower end of the cup 23 and thereby prevent gasoline from passing through the filter to the engine carburetor. Air or gasoline vapor will pass relatively slowly through the small pores of the cup 23 to escape through the outlet passages 16 and 17.

The danger just mentioned of gasoline vapor depressing the level of the gasoline below the filter cup is prevented, in accordance with the present invention, by displacing the metal upwardly in each extension 28 to form the channels 33 through which the confined air or gasoline vapor can pass over the upper edge of the cup 23, as indicated by the dotted arrow in Fig. 3, to relieve the gas pressure around the outside of such cup. Should the replaceable filter cup 23 be used long after it has become loaded with dirt so that gasoline cannot pass therethrough, the engine will not stall because the fuel will, under this condition, rise to the top of the bowl 11 and pass inwardly through the channels 33. Under normal operation when the fuel pump is working, the level of the gasoline will be slightly higher outside the cup 23 than inside, as shown in Fig. 2, since some pressure is required to force the fuel through the porous cup. The vapor area above the level of the liquid in the bowl 11 will usually extend upwardly into the area 18 as shown in Fig. 2, so that fuel will trickle down from this area.

It will be seen from the foregoing that the filter of the present invention is easy and inexpensive to service, since the replaceable filter unit shown in Fig. 3 is formed of an inexpensive molded cup 23 and thin sheet metal stampings, and all that is necessary to replace the filter cup when clogged is to unscrew the threaded ring 20 and replace the old filter unit with a new one. It will also be seen that the upper end of the cup 23 is tightly closed by the plate 24 except for the channels 33 accessible only at the under face of such plate. All danger of the filter becoming vapor locked is avoided by the vent channels 33, and the amount of fuel, water and dirt in the bowl 11 can be readily observed through the glass, as can also the appearance of the filter cup 23.

What I claim and desire to protect by Letters Patent is the following:

A filter for volatile liquids, comprising a head having an inlet passage and an outlet passage, a dirt collecting bowl removably attached to the head; and a filter unit within the bowl including a porous filter cup having a flange at its upper edge, and a supporting plate provided with radial projections that support the plate and cup suspended from the plate and is formed with arcuate portions between the projections which are crimped into gripping engagement with said flange, and at least one of said radial projections being provided with an offset rib and channel under the rib that forms a gas vent above and around the upper edge of the cup and which is accessible only at the under face of the plate.

References Cited in the file of this patent
UNITED STATES PATENTS

| | | |
|---|---|---|
| 1,422,796 | Spencer | July 11, 1922 |
| 1,816,584 | Hussar | July 28, 1931 |
| 2,567,062 | Edelen | Sept. 4, 1951 |

FOREIGN PATENTS

| | | |
|---|---|---|
| 711,131 | Great Britain | June 23, 1954 |